United States Patent [19]
Hosoya et al.

[11] Patent Number: 5,200,937
[45] Date of Patent: Apr. 6, 1993

[54] APPARATUS FOR AND METHOD OF RECORDING AND/OR REPRODUCING INFORMATION BY MEANS OF TWO ACTUATORS

[75] Inventors: Hideki Hosoya, Kawasaki; Satoshi Shikichi, Tokyo, both of Japan

[73] Assignee: Canon Kabushiki Kaisha, Tokyo, Japan

[21] Appl. No.: 917,737

[22] Filed: Jul. 23, 1992

Related U.S. Application Data

[63] Continuation of Ser. No. 835,063, Feb. 18, 1992, abandoned, which is a continuation of Ser. No. 473,598, Feb. 1, 1990, abandoned.

[30] Foreign Application Priority Data

Sep. 29, 1988 [JP] Japan ................ 63-242425
Sep. 29, 1988 [JP] Japan ................ 63-242426
Feb. 3, 1989 [JP] Japan ................ 1-024003

[51] Int. Cl.⁵ .................................... G11B 7/00
[52] U.S. Cl. .............................. 369/32; 369/41; 369/219; 360/105; 360/106
[58] Field of Search ............ 250/201.5; 360/105, 360/106, 107, 78.01, 78.12, 78.13; 369/32, 44.26, 219, 41, 221

[56] References Cited

U.S. PATENT DOCUMENTS 4,570,249 2/1986 Malissin et al. .............. 369/32 X
4,627,039 12/1986 Meyer ............................ 369/44
4,800,546 1/1989 Shikichi et al. ................ 369/44

FOREIGN PATENT DOCUMENTS 58-108041 6/1983 Japan .
63-9036 1/1988 Japan .
64-35731 2/1989 Japan .

Primary Examiner—Robert L. Richardson
Attorney, Agent, or Firm—Fitzpatrick, Cella, Harper & Scinto

[57] ABSTRACT

An apparatus for effecting recording and/or reproduction of information by illuminating a recording medium with a light beam. This apparatus is provided with a motor for moving the medium and the light beam, one actuator for moving the light beam in a direction transverse to information tracks, another actuator for moving an optical head in a direction transverse to the information tracks, a control circuit for moving the light beam from one track to another, and another control circuit for moving the optical head toward an area excluding the recording area of the track at a predetermined timing. A recording/reproducing method of this invention utilizes the aforesaid apparatus, after the light beam has reached the area excluding the recording area on a particular track, the light beam is moved to a different track and the optical head is then moved in the same direction as the direction of movement of the light beam at a predetermined timing. Then, the light beam scans the recording area to record or reproduce information.

48 Claims, 8 Drawing Sheets

APPARATUS FOR AND METHOD OF RECORDING AND/OR REPRODUCING INFORMATION BY MEANS OF TWO ACTUATORS

BACKGROUND OF THE INVENTION

1. Field of the Invention

The present invention relates to an apparatus for and a method of recording and/or reproducing information by illuminating a recording medium having a plurality of tracks with a light beam.

2. Related Background Art

It is known that recording media of the type which allow information to be recorded and reproduced by illumination of light have been provided in various forms such as discs, cards or tapes. In particular, there is a growing demand for card-like optical information recording media (hereinafter referred to as "optical cards") in the field of small-size, light-weight and transportable information recording media having large storage capacities.

FIG. 1 is a diagrammatic plan view showing a conventional optical card 101 of this kind. The card 101 comprises an information recording area 102, a plurality of information recording tracks 103, track selecting areas 104, 104' and a home position 105 for a light beam spot.

The optical card 101 is scanned by a light beam which is modulated in accordance with information to be recorded and which is formed into a miniature beam spot, whereby the information is recorded on the optical card 101 in the form of a recording pit array (information track which is optically detectable and hereinafter referred to simply as a "track"). In order to accurately record information without any trouble such as crosstalk between adjacent information tracks, it is necessary to control the illumination position of the light beam spot in the plane of the optical card in the direction perpendicular to the scan direction. (This control is hereinafter referred to as "autotracking or AT".) In addition, in order to illuminate the optical card with a stable miniature beam spot of light irrespective of the curvature and the mechanical error of the optical card, it is necessary to control the light beam in the direction perpendicular to the plane of the optical card. (This control is hereinafter referred to as "autofocus or AF".) During reproduction, the above AT and AF operations are required. The AF and AT operations are implemented, for example, by moving the objective lens incorporated in a recording and/or reproducing head (hereinafter referred to as an "optical head") in various directions.

A method of recording and reproducing information will be explained below with reference to FIG. 1. Initially, the light beam spot is located at the home position on the optical card 105. Then, the light beam spot is moved in the track selecting area 104 in the direction indicated by arrow u in FIG. 1 (in practice, an optical head which will be described later is moved), and searches for a track N to be recorded or reproduced. On the track N, the AT and the AF operations are started to scan the track N in the direction indicated by arrow r, thereby recording or reproducing information on or from the track N. In general, this scanning is performed by moving the optical card 105 in the track direction with the optical head held in position. When the light beam spot enters the track selecting area 104', only the objective lens is actuated with the optical head itself held in position, thereby moving the light beam spot to the adjacent information track (N+1). (This operation is generally called "kick".) Then, the light beam spot is made to scan the track (N+1) in the direction indicated by arrow 1 in FIG. 1 to record or reproduce information. Thereafter, in a similar manner, scanning of the light beam spot on the information tracks 103 and kicking of it in each of the track selecting areas 104 and 104' is repeated by the number of times corresponding to the amount of information.

FIG. 2A is a diagrammatic plan view showing the actuating section of an optical information recording/reproducing apparatus utilizing the aforesaid type of optical card, and FIG. 2B is a diagrammatic front elevational view of the same.

As shown in FIGS. 2A and 2B, an optical card 1 is securely mounted on a shuttle 2 which is fixed to a belt 3. The belt 3 is supported by pulleys 4a and 4b, and the pulley 4a is rotated by means of a DC motor 5. Accordingly, the motion of the motor 5 can be reversed to move the optical card 1 back and forth in the x axis direction.

An optical head 6 is disposed above the optical card 1 to movably hold an optical system 7. The optical system 7 is finely moved in the y-axis direction by means of an optical-system actuator (not shown), and a light beam 8 focused by the optical system 7 forms a light spot on the optical card 1 as will be described below. Accordingly, the light spot is finely moved in the y-axis direction by the optical-system actuator, thereby effecting the AT operation. Although the AF operation is also performed by the optical-system actuator, a description thereof is omitted.

A ball screw 9 is inserted through the optical head 6 in such a manner as to be rotated with a pulse motor 10. Accordingly, if a desired form of pulse is applied to the pulse motor 10 to control the direction and angle of rotation thereof, the optical head 6 is moved in the y-axis direction by the desired distance.

Needless to say, the AT operation is required to correct the offset between the objective lens in the recording and/or reproducing head and each of the tracks with respect to the direction perpendicular to the direction of the axis of each track, and one important cause leading to such positional offset is the offset between the direction of reciprocal motion of the optical card and the direction of the axis of each track. (This offset is hereinafter referred to as "skew".) As typical causes leading to such skew, it may be pointed out that a reference side 100 of the optical card 101 of FIG. 1 is not parallel to and is inclined with respect to the information tracks 103 and that the optical card is obliquely transported due to, for example, the imperfect operation of a card transporting mechanism. Incidentally, the skew quantity with respect to the position of the light beam spot in the track direction, that is, with respect to the amount of feed of the optical card, exhibits a linear variation, i.e., increases or decreases substantially proportionally to the amount of feed of the optical card.

The manner of recording or reproduction when skew takes place will be explained below with reference to FIG. 3.

In FIG. 3, the optical card 1 is provided with a recording area a, track jump areas b and c and tracking tracks $T_1$ to $T_n$ arranged at intervals of the distance yt.

In the recording area a, light spots $S_1$ and $S_3$ formed by the optical system 7 shown in FIG. 2B illuminate, for example, tracks $T_1$ and $T_3$, respectively, and light reflected therefrom is utilized to perform tracking control. A light spot $S_2$ illuminates the data track defined between the tracks $T_1$ and $T_2$. During illumination, the power of the light beam 8 is increased to form a pit, while, during reproduction, the light beam 8 of low power illuminates a particular formed pit and the recorded information is reproduced from reflected light. In either of these operations, since tracking control is performed on the basis of the light spots $S_1$ and $S_3$, the light spot $S_2$ consistently scans each data track along the predetermined axis thereof, whereby accurate recording or reproduction is enabled. In FIG. 3, arrows shown adjacent to the respective light spots indicate that, when the optical card 1 is moved along the X axis in the negative direction thereof by the motion of the motor 5, the light spots relatively move along the X axis in the positive direction thereof.

Subsequently, when the light spots reach the track jump area b, the optical system 7 is finely moved along the Y axis in the positive direction thereof by an optical-system actuating means, whereby the light spots jump in the positive direction of the Y axis by the distance yt. Accordingly, the light spots $S_1$ and $S_3$ move onto the adjacent tracks $T_2$ and $T_3$. In synchronism with the above operation, the motor 5 is reversed to cause the light spots to relatively move in the negative direction of the X axis. Thus, recording or reproduction of the adjacent data tracks is started. Thereafter, each adjacent track is likewise scanned in sequence.

As explained above, a cooperation between the above track jump operation and the relative movement of the optical head 6 in the X-axis or Y-axis direction by the motor 5 and the pulse motor 10 enables the light spot to have access to the desired track in the recording area a, thereby enabling recording or reproduction of information.

However, in practice, because of a skew, the direction of movement of the optical card 1 is not parallel to the axes of the respective tracks $T_l$ and $T_n$. For example, it may be assumed that the X axis shown by a dashed line represents the direction of movement of the optical card 1, that the Y axis shown by a dashed line represents the direction of movement of the optical head 6 and the optical system 7, and that $\theta_s$ represents the skew angle made between the X axis and the axis of each track $T_l$ to $T_n$.

In the presence of the skew angle $\theta_s$, if the light spot is relatively moved, the optical-system actuator means moves the optical system in the positive direction of the Y axis so as to cause the light spot to follow the track. However, the optical system 7 can only move within a particular range ($\pm Y$ max) and, if the range is exceeded, the light spot is deviated from the track and tracking control will be impossible. For this reason, to prevent the optical system 7 from exceeding the movable range, the optical head 6 is moved in the positive direction of the Y axis by means of the pulse motor 10 (hereinafter referred to as "head movement") before tracking control becomes impossible.

For example, in FIG. 3, the spot $S_1$ sequentially scans the tracks $T_1$ to $T_5$ and, toward the middle of the recording area a, the optical system 7 reaches one boundary of the movable range Y max. At this position, the optical head 6 is moved in the positive direction of the Y axis by the pulse motor 10.

However, since the angular velocity of the pulse 10 is large, the acceleration of the optical head 6 in the Y-axis direction also increases. As a result, during the head movement, a certain degree of relative positional offset occurs between the light spot $S_1$ and the track. If there are large dust particles or scratches on the optical card 1 or if an external vibration is transmitted to the optical card 1, a tracking error will easily occur. If the tracking error occurs in the recording area, the light spot will move to a neighboring recorded track, with the result that the recorded track is overwritten to damage the recorded information.

In addition, even if no tracking error occurs, since the light spot vibrates to some extent during a head movement, the data error rate of recording and/or reproduction may increase.

SUMMARY OF THE INVENTION

It is therefore an object of the present invention to provide an apparatus for and a method of recording and/or reproducing information, both of which can solve the problem involved in the above-described related art and which can implement accurate recording and/or reproduction by decreasing the probability that a tracking error occurs in a recording area.

To achieve the above object, in accordance with one aspect of the present invention, there is provided an apparatus for effecting recording and/or reproduction of information by illuminating with a light beam a recording medium having a plurality of tracks each of which is divided along its length into a recording area and an area excluding the recording area. This apparatus is provided with a motor for moving the medium and the light beam relative to each other along the length of the tracks, a first actuator for moving the light beam in a direction transverse to the tracks, an optical head provided with the first actuator, a second actuator for moving the optical head in a direction transverse to the tracks, a first control circuit for moving the light beam to a particular track from a track on which the light beam is positioned by means of the first actuator, and a second control circuit for moving the optical head toward the area excluding the recording area of the track in the same direction as that of movement of the light beam at a predetermined timing.

In accordance with another aspect of the present invention, there is provided a method of effecting recording or reproduction of information by means of the aforesaid apparatus, which method comprises the steps of recording or reproducing information by causing the light beam to scan a recording area in a particular track among the tracks, moving the light beam from the particular track to a different track by means of the first actuator after the light beam has reached the area excluding the recording area on the particular track, moving the optical head in the same direction as the direction of movement of the light beam before or after the light beam is moved by the first actuator and when the light beam is positioned in the area excluding the recording area, and recording or reproducing information by causing the light beam to scan a recording area in the different track.

The above and other objects, features and advantages of the present invention will be apparent from the following description of preferred embodiments of the invention with reference to the accompanying drawings.

DESCRIPTION OF THE PREFERRED EMBODIMENTS

Figure 4:
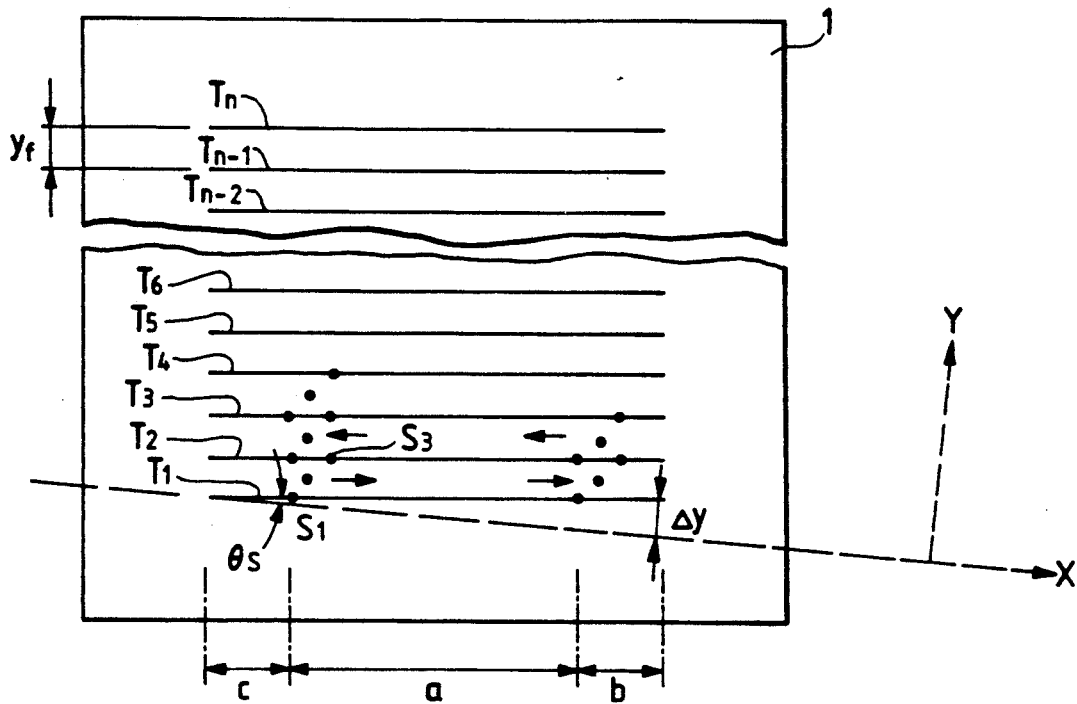
FIGS. 4 and 5 are diagrammatic plan views showing the form of recording or reproduction on or from an optical in accordance with the present invention.

FIG. 4 is a diagrammatic plan view of an optical card and serves to illustrate one example of a recording or reproducing method according to the present invention.

Since the basic operation executed according to the present invention is substantially the same as the operation described previously, the following explanation refers to only the characteristic portions of the present invention for the sake of simplicity.

As shown in FIG. 4, initially, light spots $S_1$ and $S_3$ are located on tracks $T_1$ and $T_2$, respectively. The light spots $S_1$ and $S_3$ then start to move in the positive direction of the X axis, and record a pit within a recording area a. Subsequently, when the light spots $S_1$ and $S_3$ reach an area b, they perform a track jump in the positive direction of the Y axis to move to a track $T_2$ and the track $T_3$, respectively. Subsequently, a head movement corresponding to the distance yt is performed within the area b. However, the head movement may be performed prior to the aforesaid track jump.

Then, the light spots $S_1$ and $S_3$ are moved along the X axis in the negative direction thereof to record a pit in the recording area a. When the light spots $S_1$ and $S_3$ reach an area c, they perform a track jump in a positive direction of the Y axis and move to the track $T_3$ and a track $T_4$, respectively. Before or after the track jump, a head movement corresponding to the distance yt is performed.

Figure 2A:
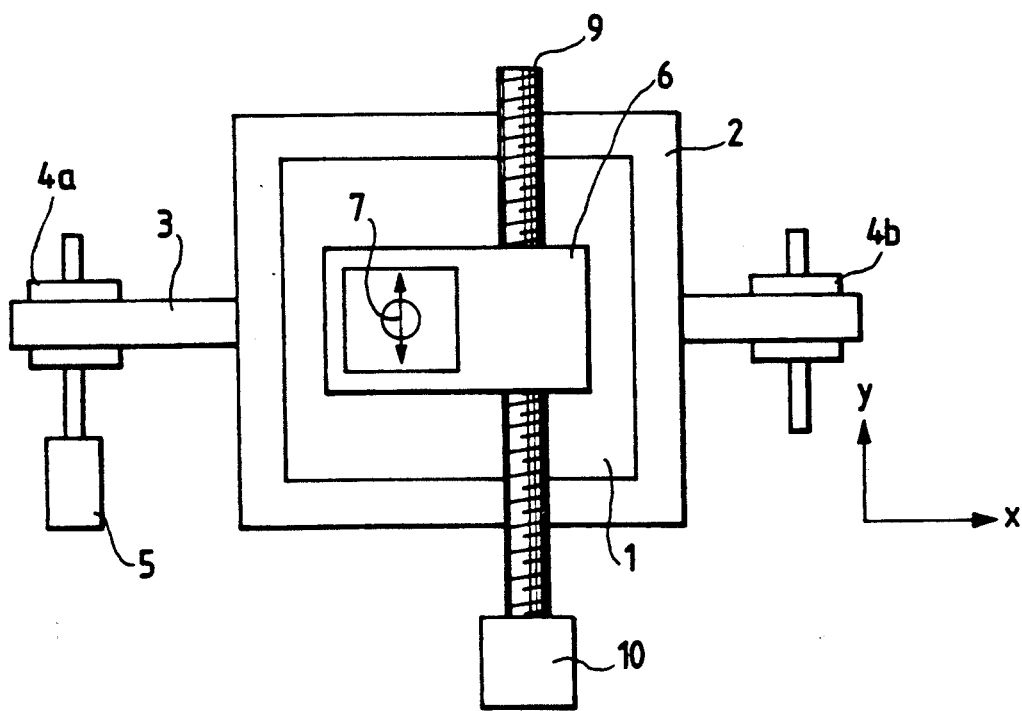
FIGS. 2A and 2B are a diagrammatic elevational view and a diagrammatic plan view each of which shows one example of a conventional optical-information recording/reproducing apparatus.
Figure 2B:
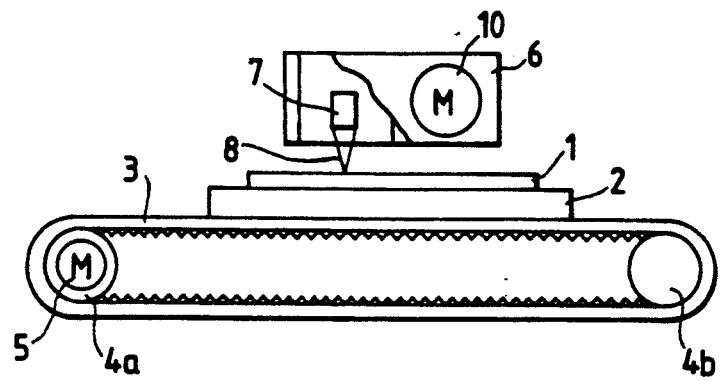
Figure 3:
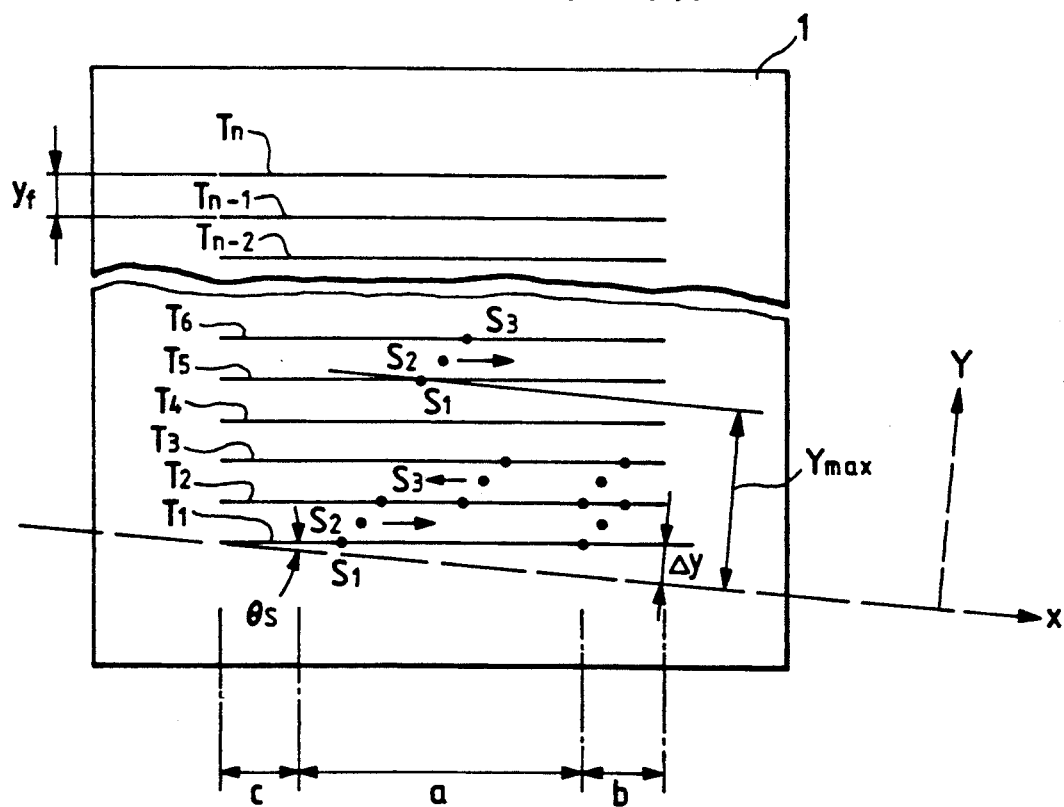
FIG. 3 is a diagrammatic plan view showing a conventional form of recording or reproduction on or from an optical card.

As is apparent from the foregoing, if the head movement for yt is necessarily performed before or after the optical system yt is displaced by yt, the maximum displacement of the optical system 7 in the arrangement shown in FIG. 2 is:

$$\Delta y + yt$$

Since this value is normally smaller than the movable range of the optical system 7, tracking control does not become impossible. Further, with this method, it is not necessary that any head movement be performed in the recording area a.

The above example has been explained with reference to the method in which a head movement is performed while the light spots are moving along the X axis in the area b or c, but the present invention is not limited to this method.

For example, U.S. application Ser. No. 155,276 discloses art in which a track jump is performed when no light spot is moving in the X-axis direction. If such art is applied to the present invention, the above head movement can be performed when the light spots are halted with respect to the X-axis direction.

Although the above example has been explained with reference to the method in which the light spots are respectively moved to adjacent tracks by means of a track jump, the present invention is not limited to this method. If a track jump for n tracks is to be performed or such a track jump has been performed, the distance of the head movement may be set to:

$$n \times yt$$

where n needs to satisfy:

$$y\,max > n \times yt + \Delta y$$

Instead of the distance associated with the aforesaid track pitch yt, the distance of the head movement may be set to an arbitrary distance $Y_H$ which satisfies the following condition:

$$Y_H < Ymax - \Delta y$$

Figure 5:
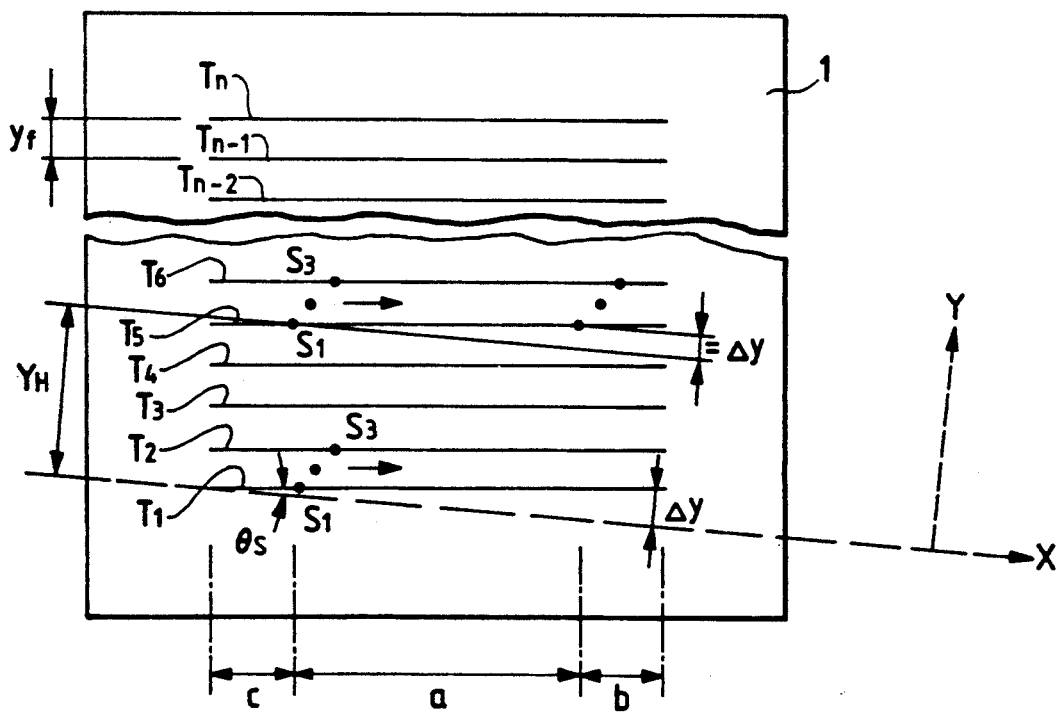

The manner of recording or reproduction based on this condition is shown in FIG. 5.

As illustrated, it is assumed that, when the light spots $S_1$ and $S_3$ are moved to tracks $T_5$ and $T_6$, respectively, the optical system 7 is displaced by the distance $Y_H$ in the Y-axis direction. At this point in time, if a head movement in the Y-axis direction is performed before the light spots enter the area a, the displacement $Y_G$ of the optical system 7 when the light spots $S_1$ and $S_3$ are moved to the area b, is given by:

$$Y_G < H_H + \Delta T < Ymax$$

Accordingly, it is not necessary to perform a head movement in the area a.

The amount of displacement of the optical system 7 in the Y-axis direction may be detected by utilizing a method of detecting the low frequency components of tracking error signals as disclosed in Japanese Patent Laid-Open No. 63-9036. Also, as disclosed in Japanese Patent Laid-Open No. 1-35731, means for detecting the position of the optical system may be incorporated.

Figure 6:
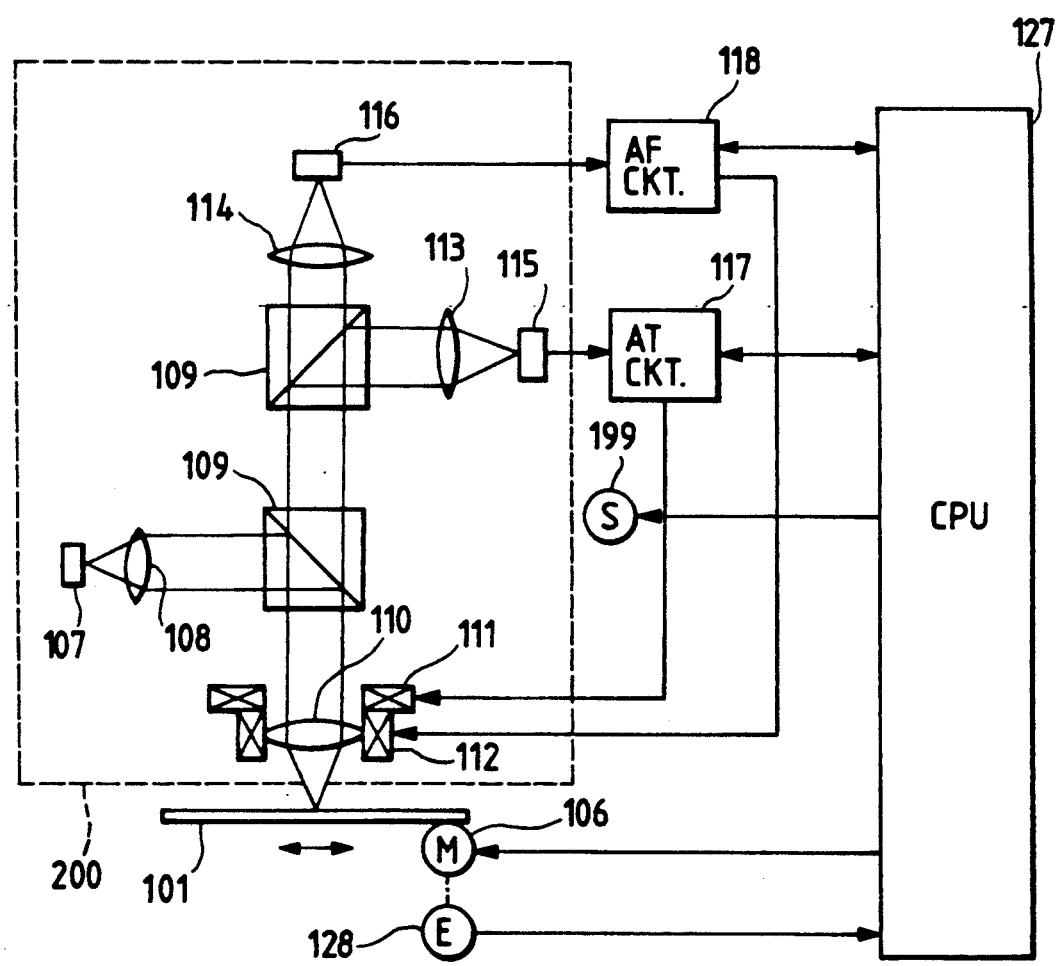
FIG. 6 is a block diagram showing one embodiment of an information recording/reproducing apparatus according to the present invention.

FIG. 6 is a diagrammatic view showing the construction of one embodiment of an information recording/reproducing apparatus according to the present invention. The apparatus of FIG. 6 comprises the following elements: a motor 106 for moving an optical card 101 in the direction indicated by the illustrated arrow and an optical head 200 for recording/reproducing information. The optical head 200 includes a light source 107 such as a semiconductor laser, a collimator lens 108, a beam splitter 109, an objective lens 110, a tracking coil 111, a focusing coil 112, condenser lenses 113 and 114 and sensors 115 and 116. The optical head 200 is capable of moving in the direction perpendicular to the plane of the drawing of FIG. 6 (in the direction transverse to the axes of information tracks) by the driving of a step motor 199. The illustrated apparatus also includes a tracking control circuit 117 and a focusing control circuit 118. The tracking control circuit 117 and the focusing control circuit 118 supply an electric current to the tracking coil 111 and the focusing coil 112 in accordance with commands output from the control circuits 117 and 118 in accordance with a tracking error signal (AT error signal) and a focusing error signal (AF error signal) on the basis of the outputs of the sensors 115 and 116, respectively, thereby moving the objective lens 110 to perform AT and AF operations. An optical or magnetic type encoder 128 is attached to the rotary shaft of the motor 106, and the output pulse of the encoder 128 is input into a central processing unit (CPU) 127. The CPU 127 can detect the amount of movement of the optical card 101 by counting this pulse.

Figure 7:
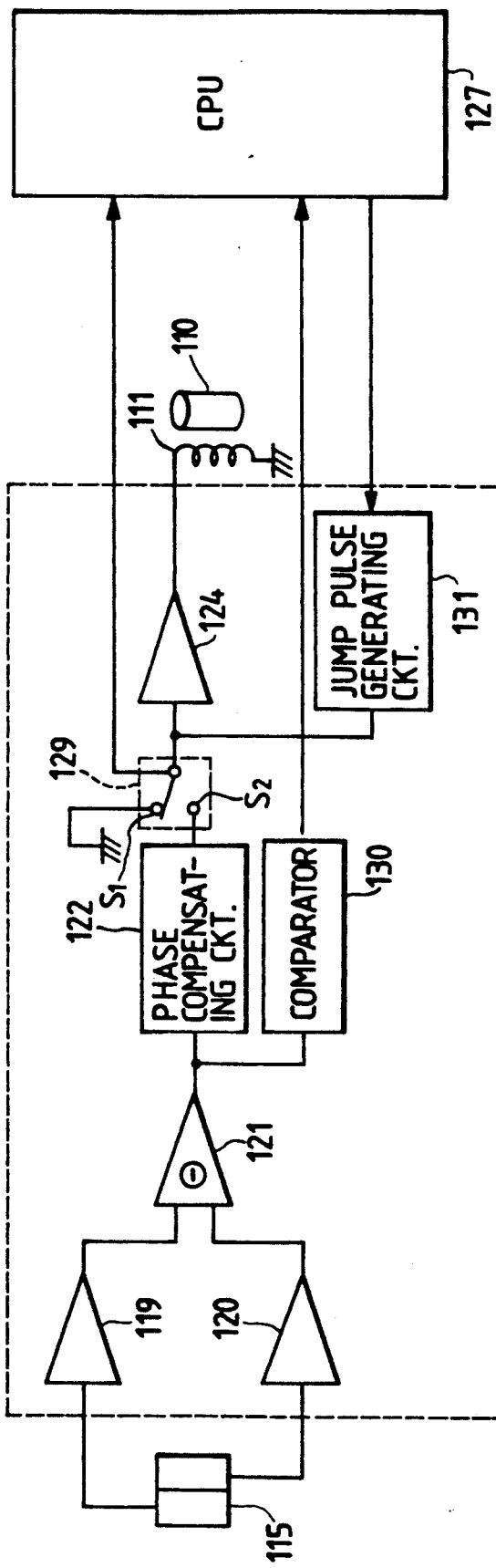
FIG. 7 is a block diagram illustratively showing the construction of a tracking control circuit for use in the apparatus shown in FIG. 6.

FIG. 7 is a block diagram showing the tracking control circuit 117 and peripheral parts. In FIG. 7, the same reference numerals are used to denote the same elements as those shown in FIG. 6. The circuit shown in FIG. 7 comprises a two-split sensor 115 for AT control and sensor amplifiers 119 and 120 for amplifying the outputs of the respective elements of the two-split sensor 115. The circuit of FIG. 7 also includes a subtracter 121 for calculating the difference between the outputs of the sensor amplifiers 119 and 120, a phase compensating circuit 122, a driver 124, and a zero-crossing comparator 130 for establishing a timing for providing AT control. The zero-crossing comparator 130 detects the output of the subtracter 121 when the light beam spot crosses a particular track, that is, a zero-crossing on the S-like curve of an AT operation, and transfers the result to the CPU 127. The zero-crossing corresponds to the time instant when the center axis of the track coincides with the center of the light beam spot and, at this point in time, an AT operation is performed. The circuit of FIG. 7 is also provided with a jump pulse generating circuit 131 for moving the light beam spot from one information track to an adjacent one. The jump pulse generating circuit 131 is arranged to output to the driver 124 a jump pulse enough to supply a large pulse current which can forcedly move the light beam spot by one track to the tracking coil 111 in accordance with the command of the CPU 127.

A switch 129 selectively connects the input of the driver 124 to the output of the phase compensating circuit 122 or the ground (zero potential). The switch 129 performs its selecting operation in accordance with the command of the CPU. When the switch 129 is connected to an Sl side, a zero voltage is input to the driver 124 so that the objective lens 110 is positioned approximately in the middle of a movable range in the AT direction. When the switch 129 is connected to an S2 side, an AT error signal, which has been appropriately phase-conpensated by the phase compensating circuit 122, is input to the driver 124, thereby performing AT control.

Figure 8:
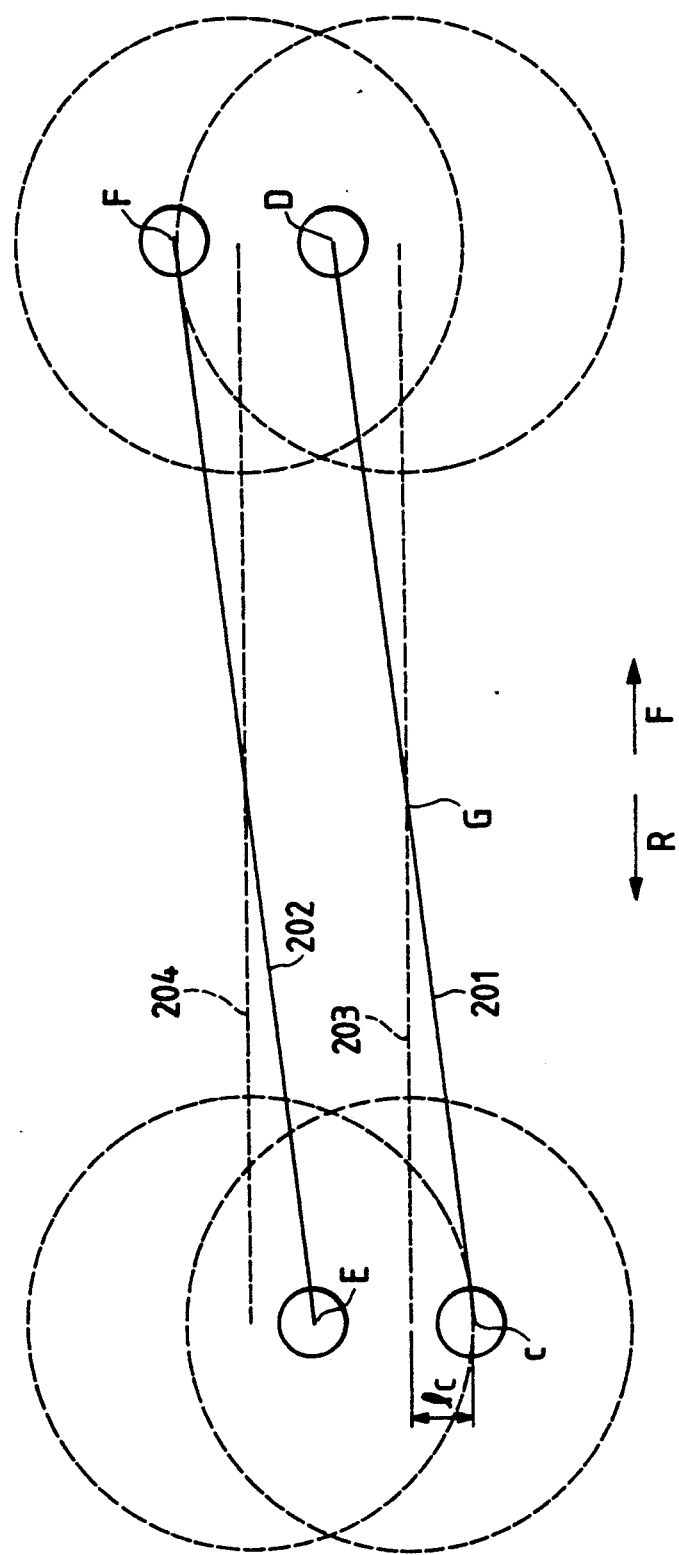
FIG. 8 is a schematic view showing the displacement of an objective lens when recording or reproduction is being performed with the apparatus shown in FIG. 6.

The operations of recording and reproduction will be explained below. FIG. 8 is a schematic view showing the operations of recording and reproduction of the information recording/reproducing apparatus according to the present invention. In FIG. 8, information tracks are denoted by 201 and 202 and straight lines parallel to the direction of feed of an optical card are denoted by 203 and 204. In FIG. 8, each circle drawn by a solid line represents an objective lens, and a circle drawn by a dotted line represents the movable range of the objective lens. (In practice, the objective lens moves up and down, that is, in the AT direction only.)

First, the recording operation will be explained below. After AF control is executed at an appropriate position, the optical head 200 is moved in the direction perpendicular to the information tracks by means of the step motor 199. In this case, the CPU 127 actuates the motor 106 in the direction indicated by arrow F to move the light beam spot approximately to the middle of the information track 201 (point G in FIG. 8). In this state, AT control is executed. The AT control is performed as follows: The switch 129 is connected to the $S_1$ side of FIG. 7 and the objective lens 110 is positioned approximately in the middle of its movable range in the AT direction and, at the instant when the comparator 130 determines that the center of the objective lens has coincided with the center axis of the information track 201, the switch 129 is switched to the S2 side to execute the AT control.

Then, after the motor 106 has been actuated in the direction indicated by arrow R of FIG. 8 to move the light beam spot back to point C, the light beam spot is again moved in the direction of arrow F of FIG. 8 to record information. After the light beam spot has reached point D (the right-hand side of the information track 201), the direction of movement of the light beam spot is reversed in the direction of arrow R. While the light beam spot is moving back to point C, the recorded information is verified. At point C, the light beam spot jumps to point E by means of the jump pulse generating circuit 131 shown in FIG. 7 and is then moved by approximately one track pitch in the direction in which the step motor 199 is kicked, thereby executing a forced head movement. The relationship between the position and the movable range of the objective lens located at point E is similar to that between the position and the movable range of the objective lens at point C. Subsequently, the above operation is repeated until recording of the required information is ended.

The reproducing operation will be explained below. The operation executed until point D is reached is similar to the above-described recording operation, except that reproduction is performed in place of recording. In reproduction, after point D has been reached, the light beam spot is moved to point F (the right-hand side of the information track 202). At this time, after the step motor 199 has been moved toward point F by approximately one track pitch to perform a forced head movement, the light beam spot is made to jump to point F. After the track jump at point F, the relationship between the position and the movable range of the objective lens is similar to that between the position and the movable range of the objective lens located at point D. Thereafter, if the information recorded on the information track 202 is reproduced, the direction of movement of the light beam spot is reversed in the direction indicated by arrow R to reproduce the information track 202. Further, if the light beam spot is to be moved to the next information (not shown), a head movement is performed after a track jump has been executed, as in the case of the movement from point C to point E. The above operation is repeated until reproduction of the required information is ended.

As is apparent from the foregoing, in the above embodiment, the light beam spot is jumped from one track to an adjacent track in the following manner. When such a track jump is to be executed with the objective lens being displaced to the end opposite to a jump direction with respect to the middle of its movable range, a forced head movement for approximately one track pitch is executed after the track jump. If a track jump is to be executed at the other end, a similar head movement is executed before the track jump. In this manner, even when information is being continuously recorded or reproduced, it is possible to effectively utilize the whole of the movable range of the objective lens in the AT direction. Incidentally, if the movable range of the objective lens has a margin on the opposite ends of each information track and the amount of margin is a length equal to or greater than one track pitch corresponding to the amount of track jump (=amount of head movement), the track jump may be executed prior to the head movement, or vice versa.

The specific numerical examples of the present invention are shown below. If the skew angle is 0.7° and the amount of feed of the optical card is 80 mm, the following skew quantity results:

$$80 \cdot \tan(0.7°) = 0.98 \text{ mm}$$

In general, since the movable range of the objective lens in the AT direction has a margin of ±0.5 mm—approximately 1 mm in width, the present invention can accommodate a skew angle of approximately 0.7°.

In the above-described embodiment, since AT control is executed approximately in the middle of each information track in the track direction, the objective lens is located approximately in the middle of the movable range in the AT direction thereof when it is situated approximately in the middle of the information track. Accordingly, since the skew quantity can be approximately equally distributed to the opposite sides separated by the middle of the movable range in the AT direction, it is possible to effectively utilize the opposite areas in the movable range of the objective lens in the AT direction.

Figure 9:
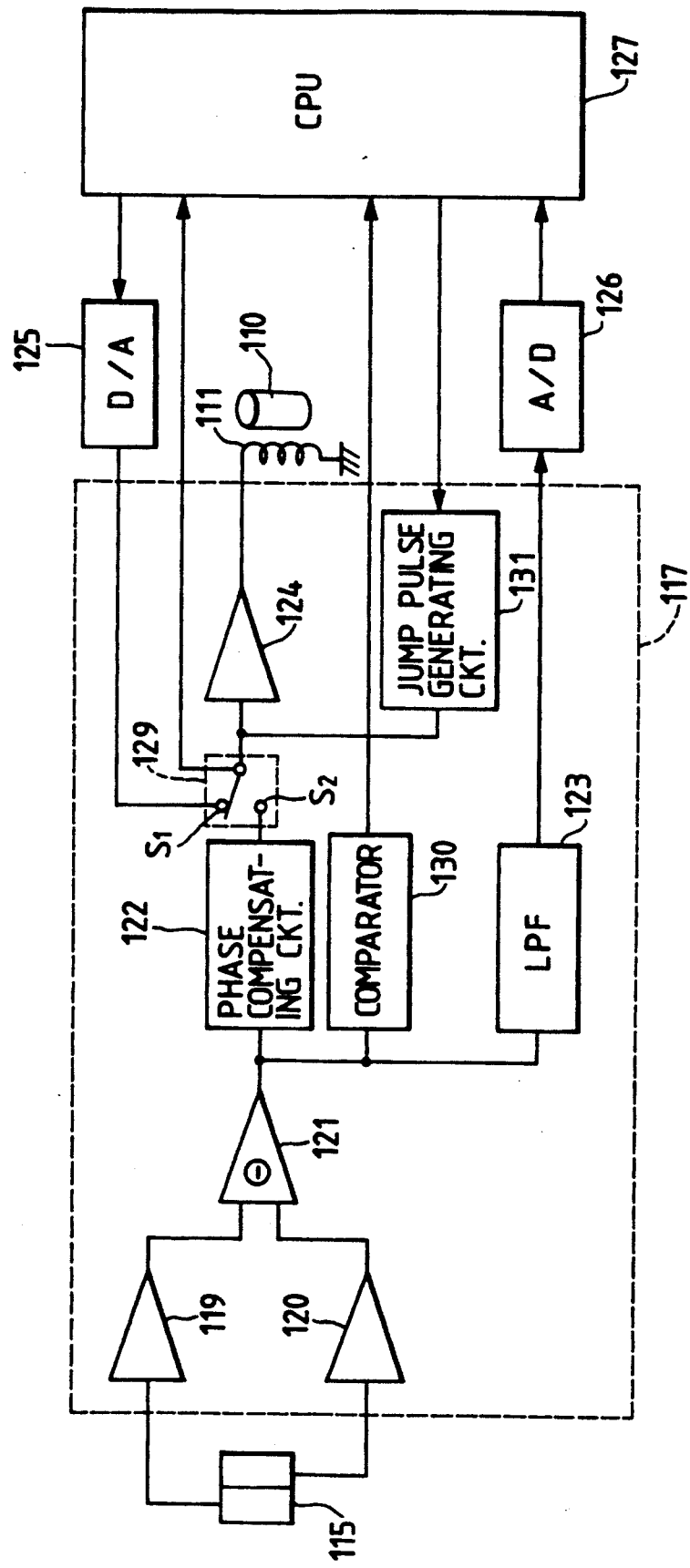
FIG. 9 is a block diagram illustratively showing another construction of the tracking control circuit used in the apparatus according to the present invention.

FIG. 9 is a block diagram showing another construction of the tracking control circuit used in the apparatus according to the present invention. The elements other than this circuit are substantially the same as those used in the apparatus shown in FIG. 6. In FIG. 9, the same reference numerals are used to denote the same elements as those shown in FIG. 7.

The circuit shown in FIG. 9 comprises the two-split sensor 115 for AT control and the sensor amplifiers 119 and 120 for amplifying the outputs of the respective elements of the two-split sensor 115. The circuit of FIG. 9 also includes the subtracter 121 for calculating the difference between the outputs of the sensor amplifiers 119 and 120, the phase compensating circuit 122, the driver 124, a low-pass filter (hereinafter referred to as "LPF") 123 for extracting the low-frequency component of an AT error signal output from the subtracter 121, and an analog/digital (A/D) converter 126 for digitizing the output of the LPF 123 and supplying the result to the CPU 127. The circuit of FIG. 9 is also provided with the zero-crossing comparator 130 for establishing a timing for providing AT control. The zero-crossing comparator 130 detects the output of the subtracter 121 when the light beam spot crosses a particular track, that is, a zero-crossing on the S-like curve of an AT operation, and transfers the result to the CPU 127. The zero-crossing corresponds to the time instant when the center axis of the track coincides with the center of the light beam spot and, at this point in time, an AT operation is executed. The circuit of FIG. 9 further includes the jump pulse generating circuit 131 for moving the light beam spot from one information track to an adjacent one. The jump pulse generating circuit 131 is arranged to output to the driver 124 a jump pulse enough to supply a large pulse current, which can forcedly move the light beam spot by one track, to the tracking coil 111 in accordance with the command of the CPU 127.

In the embodiment shown in FIG. 9, detection of the skew quantity utilizes a method of detecting the low-frequency component of an AT error signal, which method is proposed by the same applicant in Japanese Patent Laid-Open No. 63-9036. More specifically, when an optical card is reciprocally moved with a particular track placed in AT control, an AT error signal changes in accordance with the magnitude of offset between the track and the light beam spot. At this time, the AT error signal is divided into two major components, that is, a high-frequency component corresponding to the deviation of the track in the direction perpendicular to the track axis itself and a low-frequency component corresponding to the aforesaid skew quantity. Accordingly, if the LPF is used to extract the low-frequency component corresponding to the skew quantity from the AT error signal which reflects the behavior of the objective lens, the skew quantity can be detected. Accordingly, the CPU 127 can obtain the skew quantity measured at that time by accessing the output of the A/D converter 126.

A digital/analog (D/A) comparator 125 converts to an analog value the digital offset value output from the CPU 127. The switch 129 selectively connects the input of the driver 124 to the output of the phase compensating circuit 122 or the output of the D/A converter. The switch 129 performs its selecting operation in accordance with the command of the CPU. When the switch 129 is connected to the $S_1$ side, an offset signal is input to the driver 124 and amplified to a level sufficient to drive the tracking coil 111. Thus, the tracking coil 111 can move the objective lens 110 in the direction perpendicular to the track in accordance with the offset value in response to the amplified signal. When the switch 129 is connected to the $S_2$ side, an AT error signal, which has been appropriately phase-compensated by the phase compensating circuit 122, is input to the driver 124, thereby performing AT control.

Figure 10A:
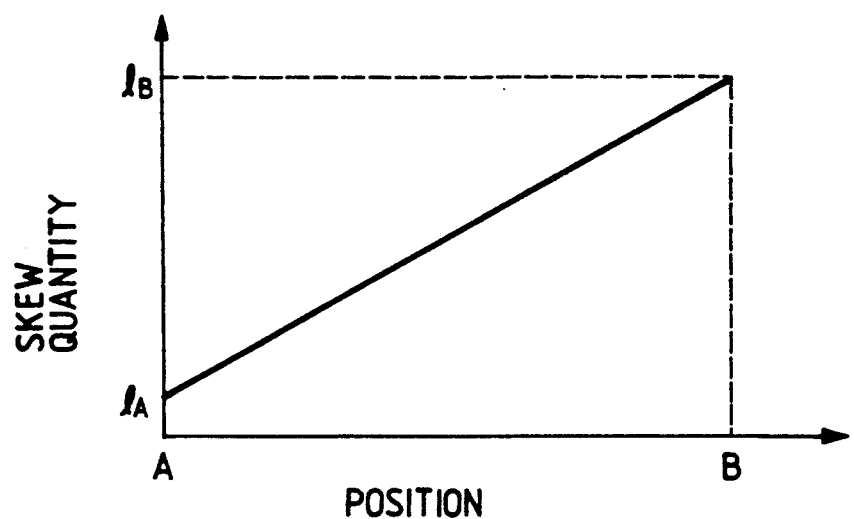
FIGS. 10A and 10B are graphic representations which serve to illustrate a method of measuring a skew quantity by means of the circuit shown in FIG. 9.
Figure 10B:
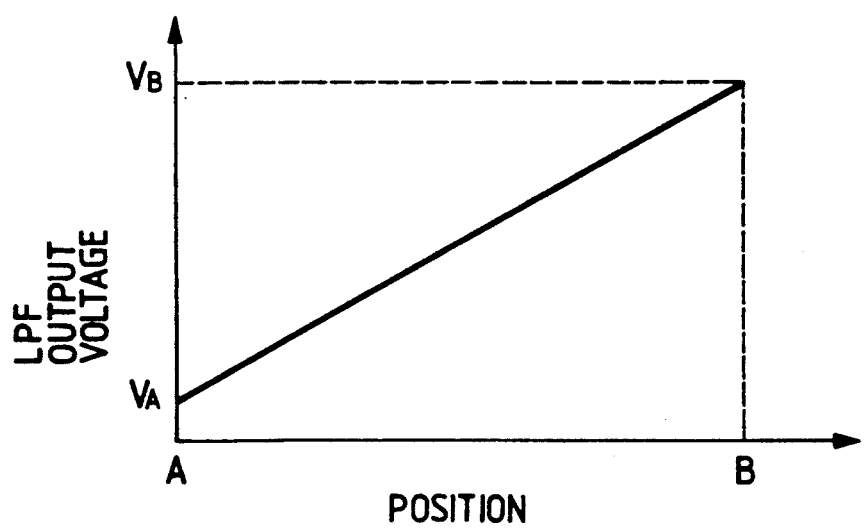

The method of determining such an offset value will be explained below. FIGS. 10A and 10B are graphic representations which serve to illustrate the method of determining the skew quantity for use in a particular embodiment of the information recording/reproducing apparatus according to the present invention. In FIG. 10A, the horizontal axis represents the position taken in the track direction with the vertical axis representing the skew quantity. The skew quantity linearily increases approximately in proportion to the position in the track direction, that is, the amount of feed of the optical card. The vertical axis of FIG. 10B represents the output voltage of the LPF 123 and, as described above, a voltage corresponding to the skew quantity is provided at the output of the LPF 123.

Figure 1:
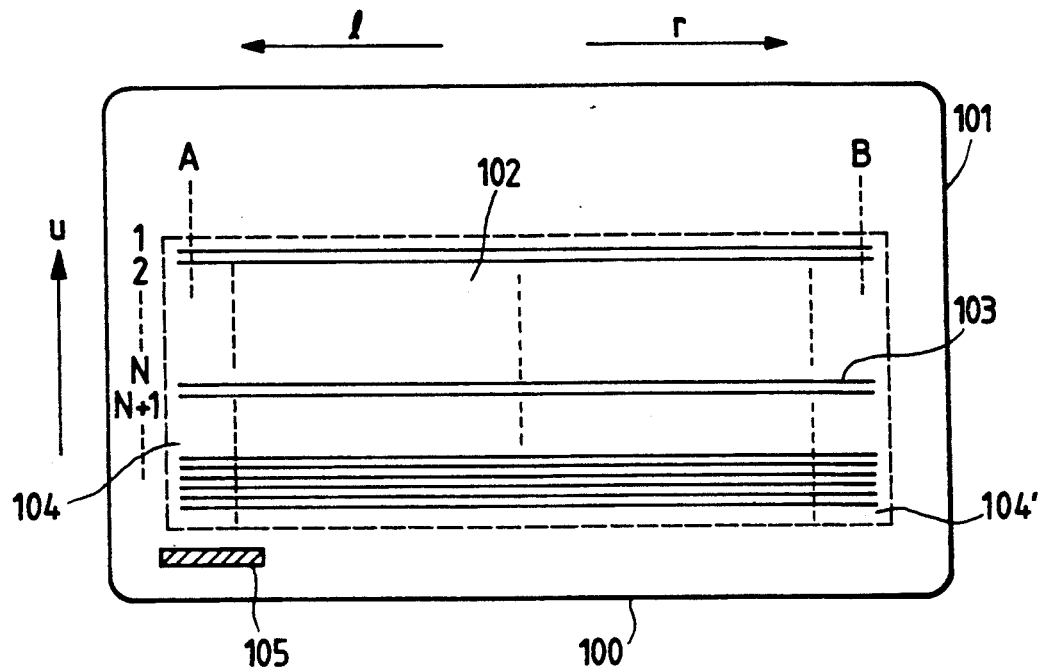
FIG. 1 is a diagrammatic plan view showing one example of an optical card.

When the light beam spot is positioned at point A of FIG. 1 (at the left-hand end of the optical card), the CPU 127 applies AT control to an arbitrary information track and accesses a voltage VA output from the $LP_F$ 123 at that time (the corresponding skew quantity is $l_A$). Then, the motor 106 is actuated to move the optical card 101 until the light beam spot reaches point B (the right-hand end of the optical card). When the light beam spot is positioned at point B, the CPU 127 stops the motor 106 to access a voltage $V_B$ output from the LPF 123 at that time (the corresponding scanning the information track from point A to point B, skew quantity is $l_B$). While the light beam spot is the objective lens moves in the direction perpendicular to the track by the distance $l_B-l_A$ in order to correct the skew. Accordingly, if at point A, the objective lens is moved in the direction in which the skew is corrected by the distance $$l_C=(l_B-l_A)/2$$

and AT control is executed, the skew quantity reaches substantially zero approximately in the middle of the information in the track direction. The offset value $V_C$ obtained at that time is:

$$V_C=G(V_B-V_A)/2$$

where G is the ratio of the input voltage of the driver 124 required to move the objective lens by the distance in the direction perpendicular to the track to the output voltage of the LPF 123. In other words, the objective lens moves by the distance $l_C$ in accordance with the offset voltage $V_C$.

In the above explanation, $V_B>V_A>0$ is selected, but this relationship is only illustrative. Various kinds of relationship such as $V_B>V_A>0$, values of negative polarity and the like can be adopted.

With reference to FIG. 8, the operations of recording and reproduction will be explained below.

Initially, the recording operation will be explained. After AF control is executed at an appropriate position, the optical head 200 is moved in the direction perpendicular to the information track by means of the step motor 199 and, at point C (the left-hand end of the information track 201), the information track 201 is placed under AT control. At this time, the CPU 127 inputs the offset voltage $V_C$ obtained from the previously measured skew quantity into the driver 124 by connecting the switch 129 to the s1 side to move the objective lens by the distance $l_C$. At the instant when the comparator 130 determines that the center of the objective lens has coincided with the center axis of the information track 201, the switch 129 is switched to the s2 side to execute the AT control.

Then, after the motor 106 has been actuated, information is recorded while the light beam spot is being moved in the direction of arrow F of FIG. 8. After the light beam spot has reached point D (the light-hand end of the information track 201), the direction of movement of the light beam spot is reversed in the direction of arrow R. While the light beam spot is moving back to point C, the recorded information is verified. At point C, the light beam spot jumps to point E and then moves by approximately one track pitch in the direction in which the step motor 199 is kicked, thereby executing a forced head movement. The relationship between the position and the movable range of the objective lens located at point E is similar to that between the position and the movable range of the objective lens at point C. Subsequently, the above operation is repeated until recording of the required information is ended.

The reproducing operation will be explained below. The operation executed until point D is reached is similar to the above-described recording operation, except that reproduction is performed in place of recording. In reproduction, after point D has been reached, the light beam spot is moved to point F (the right-hand end of the information track 202). At this time, after the step motor 199 has been moved toward point F by approximately one track pitch to execute a forced head movement, the light beam spot is made to jump to point F. The relationship between the position and the movable range of the objective lens after the track jump at point F is similar to that between the position and the movable range of the objective lens located at point D. Thereafter, if the information recorded on the information track 202 is reproduced, the direction of movement of the light beam spot is reversed in the direction indicated by arrow R to reproduce the information track 202. Further, if the light beam spot is to be moved to the next information (not shown), a head movement is performed after a track jump has been executed, as in the case of the movement from point C to point E. The above operation is repeated until reproduction of the required information is ended.

In general, if the skew quantity is excessively large, the objective lens may reach the limit of its movable range while the skew quantity is being measured, and an unnecessary head movement may occur. To cope with this problem, after a temporary offset value has been determined on the basis of the skew quantity obtained before the head movement occurs, the process of measuring the skew quantity on the basis of the offset value and determining a new temporary offset value is repeated until it becomes possible to measure the skew quantity without head movement. Thereafter, a true offset value may be obtained.

Although the skew quantity is measured from the low-frequency component of an AT error signal in the above embodiment, this measurement may be performed by means of a separate sensor for detecting the position of the objective lens as disclosed in Japanese Patent Laid-Open No. 1-35731 filed by the same applicant.

Although the above embodiment employs a two-split sensor as an AT sensor, this arrangement may be modified in accordance with the kind of tracking method (for example, a push-pull method). Needless to say, the present invention is applicable to any kind of tracking method.

Basically, it is only necessary that measurement of the skew quantity be executed once prior to recording/reproduction when the optical card is inserted into the apparatus. However, in the case of a specific structure of a card feed mechanism or the like, there may be a difference in skew quantity between an information track near the reference side 100 of, FIG. 1 and an information track remote therefrom. To cope with this problem, a plurality of information tracks may be divided into some groups on the basis of the distance from the reference side so that an offset value per group can be determined.

The present invention is not limited to the above-described embodiments and can be applied in various forms. For instance, the form of medium usable in the present invention is not limited to a card, and any other form such as a disc, a tape or the like may be used. If a disc-like medium having a spiral track is employed, a light beam moves from one track to an adjacent track per rotation of the disc under AT control. In this case, it suffices to move a head once per rotation of the disc by a distance corresponding to one track pitch outside a recording area.

While the present invention has been described with respect to what is presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An apparatus for effecting recording and/or reproduction of information by illuminating with a light beam a recording medium having a plurality of tracks each of which is divided along its length into a recording area and an area excluding said recording area, said apparatus comprising:
   a motor for moving said medium and said light beam relative to each other along the length of said tracks;
   a first actuator for moving said light beam in a direction transverse to said tracks;
   an optical head provided with said first actuator;
   a second actuator for moving said optical head in a direction transverse to said tracks;
   a first control circuit for moving said light beam to a particular track from a track on which said light beam is positioned by means of said first actuator; and
   a second control circuit for moving said optical head in the same direction as that of movement of said light beam at a predetermined timing when said light beam is positioned in said area excluding said recording area of said track.

2. An apparatus according to claim 1, wherein said second control circuit moves said optical head by a distance equal to the distance between said tracks between which said light beam has moved.

3. An apparatus according to claim 2, wherein said first control circuit moves said light beam from a particular track to an adjacent track, while said second control circuit moves said optical head by a distance equal to a track pitch.

4. An apparatus according to claim 1, wherein said first actuates moves an objective lens in a direction transverse to said tracks, and said objective lens converges said light beam onto said recording medium.

5. An apparatus according to claim 1, wherein said first control circuit is a jump pulse generating circuit for supplying a pulse current to said first actuator.

6. An apparatus according to claim 1, wherein said second actuator is a pulse motor.

7. An apparatus according to claim 1, wherein said recording medium is a card-like optical recording medium on which a plurality of linear tracks are arranged side by side, said motor moving said recording medium back and forth along the length of any of said tracks.

8. An apparatus according to claim 7, wherein each of said tracks on said recording medium has a recording area in its middle and track jump areas at its opposite ends, said first and second control circuits moving said light beam and said optical head when said light beam is positioned in either of said track jump areas.

9. An apparatus according to claim 1, wherein, when said light beam is biased from its movable center position in one direction in said area excluding said recording area on said track and when said light beam is to be moved in the other direction, said first and second control circuits move said light beam by means of said first actuator and then move said optical head.

10. An apparatus according to claim 1, wherein, when said light beam is biased from its movable center position in one direction in said area excluding said recording area on said track and when said light beam is to be moved in the same direction, said first and second control circuits move said optical head and then move said light beam by means of said first actuator.

11. An apparatus for effecting recording and/or reproduction of information by illuminating with a light beam a recording medium having a plurality of tracks each of which is divided along its length into a recording area and an area excluding said recording area, said apparatus comprising:
   a motor for moving said medium and said light beam relative to each other along the length of said tracks;
   a first actuator for moving said light beam in a direction transverse to said tracks;
   a detecting circuit for detecting a tracking error signal indicative of the positional relationship between said track and said light beam;
   a tracking control circuit for feeding back to said first actuator said tracking error signal detected by said detecting circuit;
   an optical head provided with said first actuator;
   a second actuator for moving said optical head in a direction transverse to said tracks;
   a track jump control circuit for moving said light beam to a particular track from a track on which said light beam is positioned by means of said first actuator; and
   a head movement control circuit for moving said optical head in the same direction as that of movement of said light beam at a predetermined timing when said light beam is positioned in said area excluding said recording area of said track.

12. An apparatus according to claim 11, wherein said head movement control circuit moves said optical head by a distance equal to the distance between said tracks between which said light beam has moved.

13. An apparatus according to claim 12, wherein said track jump control circuit moves said light beam from a particular track to an adjacent track, while said head movement control circuit moves said optical head by a distance equal to a track pitch.

14. An apparatus according to claim 11, wherein said first actuator moves an objective lens in a direction transverse to said tracks, and said objective lens converges said light beam onto said recording medium.

15. An apparatus according to claim 11, wherein said track jump control circuit is a jump pulse generating circuit for supplying a pulse current to said first actuator.

16. An apparatus according to claim 11, wherein said second actuator is a pulse motor.

17. An apparatus according to claim 11, wherein said recording medium is a card-like optical recording medium on which a plurality of linear tracks are arranged side by side, said motor moving said recording medium back and forth along the length of any of said tracks.

18. An apparatus according to claim 17, wherein each of said tracks on said recording medium has a recording area in its middle and track jump areas at its opposite ends, said track jump and head movement control circuits moving said light beam and said optical head when said light beam is positioned in either of said track jump areas.

19. An apparatus according to claim 17, further comprising a tracking introduction control circuit for placing said tracking control circuit in an operative or inoperative state as occasion demands, said tracking introduction control circuit being arranged to hold said light beam in the middle of a movable range thereof when said tracking control circuit is in the inoperative state and to switch said tracking control circuit from said inoperative state to said operative state in the middle of said track.

20. An apparatus according to claim 17, further comprising a tracking introduction control circuit for placing said tracking control circuit in an operative or inoperative state as occasion demands and a measurement circuit for measuring the skew quantity of said track, said tracking introduction control circuit being arranged to hold said light beam at a distance of half the skew quantity measured by said measurement circuit from the middle of a movable range thereof when said tracking control circuit is in the inoperative state, and to switch said tracking control circuit from said inoperative state to said operative state on the end of both ends of said track that has skewed in the same direction as the bias direction of said light beam.

21. An apparatus according to claim 11, wherein, when said light beam is biased from its movable center position in one direction in said area excluding said recording area on said track and when said light beam is to be moved in the other direction, said track jump control and head movement control circuits move said light beam by means of said first actuator and then move said optical head.

22. An apparatus according to claim 11, wherein, when said light beam is biased from its movable center position in one direction in said area excluding said recording area on said track and when said light beam is to be moved in the same direction as said bias direction, said track jump control and head movement control circuits move said optical head and then move said light beam by means of said first actuator.

23. A method of effecting recording or reproduction of information by means of an apparatus provided with means for illuminating with a light beam a recording medium having a plurality of tracks each of which is divided along its length into a recording area and an area excluding said recording area, an actuator for moving said light beam in a direction transverse to said tracks, and an optical head provided with said actuator, said method comprising the steps of:
  recording or reproducing information by causing said light beam to scan a recording area in a particular track among said tracks;
  moving said light beam from said particular track to a different track by means of said actuator after said light beam has reached said area excluding said recording area on said particular track;
  moving said optical head in the same direction as the direction of movement of said light beam before or after said light beam is moved by said actuator and when said light beam is positioned in said area excluding said recording area; and
  recording or reproducing information by causing said light beam to scan a recording area in said different track.

24. A method according to claim 23, wherein said optical head is moved by a distance equal to the distance between said tracks between which said light beam has moved.

25. A method according to claim 24, wherein said light beam is moved to an adjacent track, while said optical head is moved by a distance equal to a track pitch.

26. A method according to claim 23, wherein said recording medium is a card-like optical recording medium on which a plurality of linear tracks are arranged side by side, said recording medium being moved back and forth with respect to said light beam along the length of any of said tracks.

27. A method according to claim 26, wherein each of said tracks on said recording medium has a recording area in its middle and track jump areas at its opposite ends, said light beam and said optical head are moved when said light beam is positioned in either of said track jump areas.

28. A method according to claim 26, further including the step of introducing tracking in the middle of said track before an initial scan with said light beam.

29. A method according to claim 26, further including the steps of: measuring the skew quantity of a particular track before an initial scan with said light beam; biasing said light beam by a distance corresponding to half the skew quantity measured with respect to the middle position of the movable range of said light beam; and introducing tracking on the end of both ends of said track that has skewed in the same direction as the bias direction of said light beam.

30. A method according to claim 23, wherein, when said light beam is biased from its movable center position in one direction in said area excluding said recording area on said track and, when said light beam is to be moved in the other direction, said light beam, is moved by means of said first actuator and said optical head is then moved.

31. A method according to claim 23, wherein, when said light beam is biased from its movable center position in one direction in said area excluding said recording area on said track and when said light beam is to be moved in the same direction as the bias direction of said light beam, said optical head is moved and said light beam is then moved by means of said actuator.

32. An apparatus for recording and/or reproducing information by projecting a light beam onto a recording medium which includes a plurality of tracks divided into a recording area and another area in a longitudinal direction, said apparatus comprising:
  a motor for relatively moving said recording medium and light beam in the longitudinal direction of said tracks;
  a first actuator for moving said light beam in a direction transverse to said tracks;
  a light head for mounting said first actuator;
  a second actuator for moving said light head in a direction transverse to said tracks;
  a first control circuit for controlling movement of the light beam executed by said first actuator in the transverse direction of the tracks; and
  a second circuit for causing said second actuator to move said light head in the transverse direction of said tracks at a predetermined timing at which the light beam is located outside the recording area of said tracks.

33. An apparatus according to claim 32, wherein said first actuator moves an objective lens in the transverse direction of said tracks, and said objective lens converges the light beam onto said recording medium.

34. An apparatus according to claim 32, wherein said second actuator comprises a pulse motor.

35. An apparatus according to claim 32, wherein said recording medium is an optical recording medium including a plurality of parallel linear tracks, and said motor moves said recording medium forwardly and backwardly in the longitudinal direction of the tracks.

36. An apparatus for recording and/or reproducing information by projecting a light beam onto a recording medium which includes a plurality of tracks divided into a recording area and another area in a longitudinal direction, said apparatus comprising:

a motor for relatively moving said recording medium and light beam in the longitudinal direction of said tracks;

a first actuator for moving said light beam in a direction transverse to said tracks;

a detection circuit for detecting a tracking error signal which represents a positional relationship between said tracks and the light beam;

a tracking control circuit for feeding back the tracking error signal detected by said detection circuit to said first actuator;

a light head for mounting said first actuator;

a second actuator for moving said light head in the transverse direction of said tracks; and a second circuit for causing said second actuator to move said light head in the transverse direction of said tracks at a predetermined timing at which the light beam is located outside the recording area of said tracks.

37. An apparatus according to claim 36, wherein said first actuator moves an objective lens in the transverse direction of said tracks, and said objective lens converges the light beam onto said recording medium.

38. An apparatus according to claim 36, wherein said second actuator comprises a pulse motor.

39. An apparatus according to claim 36, wherein said recording medium is an optical recording medium including a plurality of parallel linear tracks, and said motor moves said recording and backwardly the longitudinal direction of the tracks.

40. A method of recording and/or reproducing information by using an apparatus including means for projecting a light beam onto a recording medium which comprises a plurality of tracks divided in a longitudinal direction into a recording area and another area, a first actuator for moving the light beam in a transverse direction of the tracks, a light head for mounting the first actuator, and a second actuator for moving the light beam in the transverse direction of the tracks, said method comprising the steps of:

scanning one recording area of the tracks with the light beam to record and/or reproduce the information;

causing the first actuator to move the light beam from a first track to a second track among the plurality of tracks;

causing the second actuator to move the light head in the same direction as the movement of the light beam when (i) the light beam is located outside the information recording area, and (ii) before or after the light beam is moved by the first actuator; and scanning the recording area of the second track with the light beam to record and/or reproduce the information.

41. A method according to claim 40, further comprising driving the light head with the second actuator by a distance equal to the distance between the first track and the second track.

42. A method according to claim 41, further comprising moving the light beam by the first actuator to an adjacent track, and moving the light beam by the second actuator by a distance equal to track pitch.

43. A method according to claim 40, wherein the recording medium is an optical recording medium of card-like shape provided with a plurality of linear tracks, and further comprising moving the recording medium forwardly and backwardly with respect to the light beam by a motor.

44. A method according to claim 40, wherein the recording medium is provided with the recording area in a central portion thereof and a track-jump area at both end portions of the central area, and further comprising moving the light beam and the light head by the first and second actuators, respectively, when the light beam is within the track-jump area.

45. A method according to claim 14, further comprising performing tracking in the central portion of the track before a first scanning of the light beam.

46. A method according to claim 44, further comprising measuring a skew amount of the track before a first scanning of the light beam, moving the light beam by half a distanced of the measured skew amount towards the center of a movable range of the light beam, and performing tracking at both end portions of a track at which the skew is occurring, in the same direction as a bias direction of the light beam.

47. A method according to claim 40, further comprising first moving the light beam with the first actuator and then moving the light head with the second actuator, in a portion outside the recording area of the track, when the light beam is biased in a direction toward the center of a movable range of the light beam and the light beam is to be moved in another direction.

48. A method according to claim 40, further comprising first moving the light head with the second actuator and then moving the light beam with the first actuator, in a portion outside the recording area of the track, when the light beam is biased in a direction toward the center of a movable range of the light beam and the light beam is to be moved in the same direction.

* * * * *

UNITED STATES PATENT AND TRADEMARK OFFICE
CERTIFICATE OF CORRECTION

PATENT NO. : 5,200,937
DATED : April 6, 1993
INVENTOR(S) : Hideki Hosoya, et al.

It is certified that error appears in the above-identified patent and that said Letters Patent is hereby corrected as shown below:

COLUMN 3

Line 15, "enabled. .In" should read --enabled. In--.

COLUMN 5

Line 13, "optical" should read --optical card--; and
Line 61, "optical system yt" should read --optical system 7--.

COLUMN 6

Line 27, "y max>n x yt+$\Delta$y" should read --y max>n X yt +$\Delta$y--.

COLUMN 10

Line 32, "comparator 125" should read --converter 125--; and
Line 68, "$LP_F$" should read --LPF--.

UNITED STATES PATENT AND TRADEMARK OFFICE
CERTIFICATE OF CORRECTION

PATENT NO. : 5,200,937
DATED : April 6, 1993
INVENTOR(S) : Hideki Hosoya, et al.

It is certified that error appears in the above-indentified patent and that said Letters Patent is hereby corrected as shown below:

COLUMN 11

Line 7, "corresponding scanning" should read --corresponding skew quantity is $l_B$). While the light beam spot is scanning--;
Line 8, "skew quan-" should be deleted;
Line 9, "tity is $l_B$). While the light beam spot is" should be deleted;
Line 24, "distance" should read --distance l--;
Line 31, "relationship" should read --relationships-- and "$V_B>V_A>0$" should read --$V_A>V_B>0$--; and
Line 53, "light-hand" should read --right-hand--.

COLUMN 12

Line 55, "of," should read --of--.

COLUMN 13

Line 50, "actuates" should read --actuator--.

COLUMN 16

Line 40, "beam," should read --beam--.

UNITED STATES PATENT AND TRADEMARK OFFICE
CERTIFICATE OF CORRECTION

PATENT NO. : 5,200,937
DATED : April 6, 1993
INVENTOR(S) : Hideki Hosoya, et al.

It is certified that error appears in the above-indentified patent and that said Letters Patent is hereby corrected as shown below:

COLUMN 17

Line 49, "recording and" should read --recording medium forwardly and-- and "the" should read --in the--.

COLUMN 18

Line 36, "claim 14," should read --claim 44,--; and
   Line 42, "distanced" should read --distance--.

Signed and Sealed this

Twenty-second Day of March, 1994

Attest:

BRUCE LEHMAN

*Attesting Officer*        *Commissioner of Patents and Trademarks*